United States Patent [19]

Jacobsen et al.

[11] Patent Number: 4,995,261
[45] Date of Patent: Feb. 26, 1991

[54] FIELD-BASED MOVEMENT SENSING APPARATUS

[75] Inventors: Stephen C. Jacobsen; John E. Wood, both of Salt Lake City, Utah

[73] Assignee: Sarcos Group, Salt Lake City, Utah

[21] Appl. No.: 424,406

[22] Filed: Oct. 20, 1989

Related U.S. Application Data

[63] Continuation-in-part of Ser. No. 332,593, Apr. 3, 1989.

[51] Int. Cl.$^5$ .............................................. G01B 7/16
[52] U.S. Cl. ...................................... 73/767; 73/777; 357/25
[58] Field of Search ...................... 73/767, 777, 862.68, 73/862.64; 357/25, 26

[56] References Cited

U.S. PATENT DOCUMENTS 4,772,928  9/1988  Dietrich et al. ........................ 357/26
4,873,871  10/1989  Bai et al. ............................... 73/777

*Primary Examiner*—Jerry W. Myracle
*Attorney, Agent, or Firm*—Thorpe, North & Western

[57] ABSTRACT

A transducer for measuring strain in an object on which the transducer is placed includes a flexible, generally planar frame member for placement on the object. The frame member, in turn, includes a pair of generally parallel beams, one of which is moveable with respect to the other when the object is subjected to strain, and a plurality of spaced-apart laterally flexible connecting beams extending between the pair of beams. The transducer also includes a force field emitter disposed on the one moveable beam for producing a force field which diminishes in strength with distance from the force field emitter. A spacer plate is disposed on the other of said parallel beams and a substrate is disposed on the spacer plate so as to be be positioned above, but spaced from the frame member. A detection element is disposed on the underside of the substrate generally above the force field emitter for detecting the presence of the force field and for producing signals representing force field strength and thus the distance of the detecting element from the force field emitter.

8 Claims, 2 Drawing Sheets

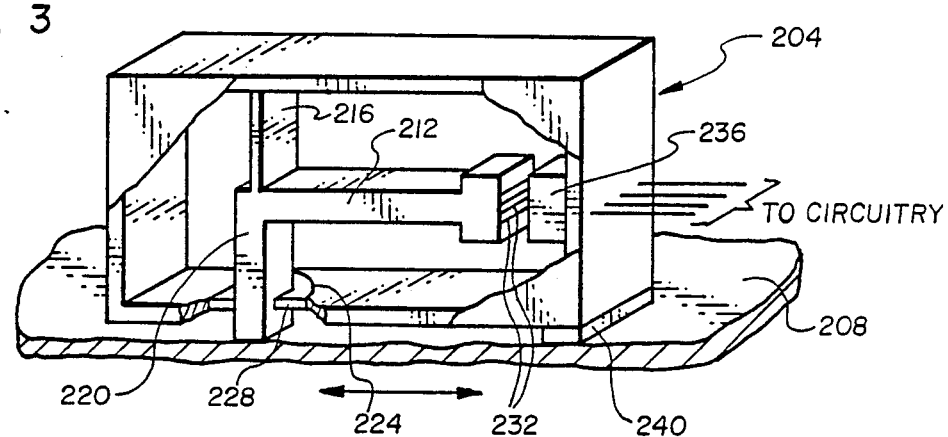
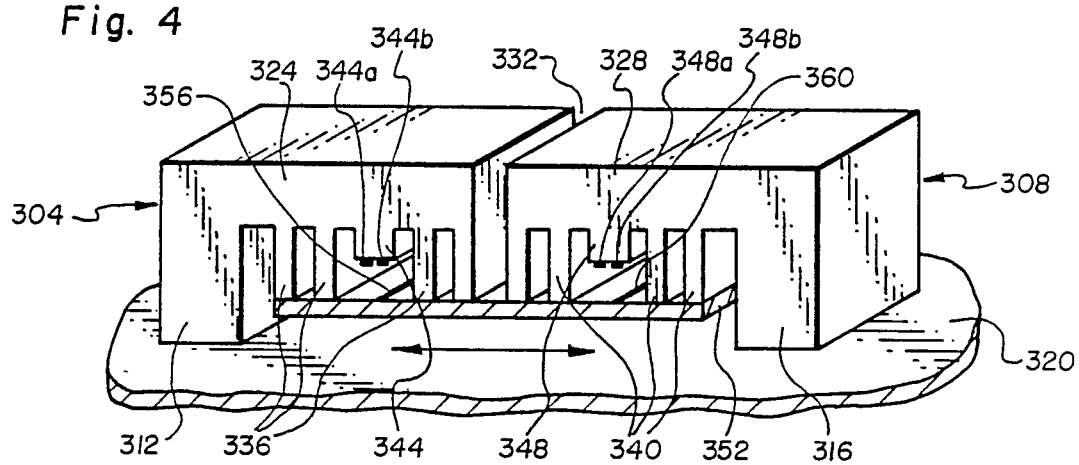
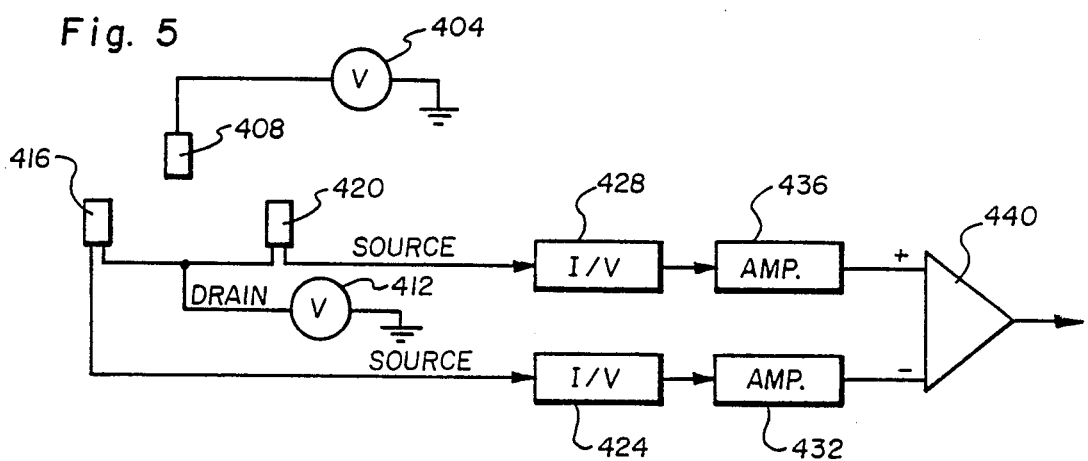

FIELD-BASED MOVEMENT SENSING APPARATUS

This is a continuation-in-part of application Ser. No. 07/332,593, filed Apr. 3, 1989.

BACKGROUND OF THE INVENTION

This invention relates in general to apparatus for sensing movement, and in particular instances to devices for measuring strain in an object and devices for measuring acceleration.

Measurement of strain (the change in length of an object in some direction per unit undistorted length) in specimens and objects may be carried out either directly or indirectly. Some of the approaches used for direct strain measurements include the use of bonded wire strain gages (in which a grid of strain-sensitive wire is cemented to a specimen so that a change in the length of the grid due to strains in that specimen changes the resistance of the wire which can then be measured), mechanical strain gages (in which optical or mechanical lever systems are employed to multiply the strain which may then be read from a suitable scale), magnetic strain gages (which include magnetic circuits having air gaps which, when varied as a result of a strain in the specimens, varies the permeance of the circuits to provide an indication of the strains produced), semiconductor strain gages (in which the resistance of a piezoresistive material varies with applied stress and resulting strain in the material), and capacitance strain gages (in which a variation of capacitance caused by variation in the separation of elements due to strain in the specimen, can be measured to provide a reading of the strain). Other direct strain measuring devices include acoustic strain gages, brittle lacquer coatings, photo grids and cathetometers.

Approaches for indirectly measuring strain in a specimen include the use of displacement pickup devices, velocity pickup devices and acceleration detection devices.

A disadvantage of the conventional approaches to measuring strain (or forces including those produced by acceleration, weight, or the like), is that the devices employed are oftentimes difficult to attach to or to use with a specimen whose strain is to be measured. Also, such devices are typically difficult and costly to manufacture. Finally, because of the intrinsically high axial rigidity of many of such devices, it requires high quality bonding of the device to the specimen to prevent detachment due to failure of the bond and this, in turn, requires time-consuming and careful preparation of the specimen for bonding.

One approach to measuring forces in general has included the use of a parallelogram-type structure in which are mounted capacitive elements arranged to measure forces applied to the structures. Examples of some such devices include those disclosed in U.S. Pat. Nos. 4,092,856, 4,308,929, 4,572,006 and 4,649,759. All but one of the devices disclosed in these patents utilize variation of capacitance resulting from variation in the separation of the capacitive elements as the mechanism for measuring force. The capacitive elements are mounted on the structures in face-to-face relationships and making it difficult to fabricate and miniaturize the structure.

SUMMARY OF THE INVENTION

It is an object of the invention to provide a movement sensor which is easy to fabricate, simple in design and readily usable for measuring a variety of forces and movement imposed generally along an axis.

It is also an object of the invention to provide at least some embodiments of such a sensor with a relatively low, flat profile suitable for attaching to an object in which strain is to be measured.

It is a further object of the invention to provide such a sensor which is relatively small in size and well-suited for use with semiconductors and integrated circuits.

It is an additional object of the invention to provide such a sensor which can be fabricated utilizing conventional integrated circuit fabrication technology.

The above and other objects of the invention are realized in one specific illustrative embodiment of a movement sensor adapted for measuring movement or strain along a certain axis in an object to which the sensor is attached. The sensor includes a flexible generally planar frame member for disposition on the object, the frame member having a pair of generally parallel beams one of which is moveable with respect to the other when the object is subject to strain, and a plurality of spaced-apart laterally flexible connecting beams extending between the pair of beams. A force field producing element, such as an electrically charged element or a magnetic field producing element, is disposed on the one moveable beam. A spacer is positioned on the other of the pair of beams, and a substrate is disposed on the spacer so as to be positioned above and out of contact with the frame member. A detection element, such as a field-effect transistor capable of detecting electric fields or a split-drain magnetic field-effect transistor capable of detecting magnetic fields, is disposed on the substrate at a location generally above the force field producing element. As the object on which the frame member is attached is subjected to strain causing the one beam of the pair to move with respect to the other beam, the variations in the strength of the force field from the force field producing element as detected by the force field detecting element is determined and this provides a measure of the variation in distance between the force field producing element and force field detecting element This variation in distance, in turn, provides a measure of the strain in the object to which the frame member is attached

BRIEF DESCRIPTION OF THE DRAWINGS

The above and other objects, features and advantages of the invention will become apparent from a consideration of the following detailed description presented in connection with the accompanying drawings in which:

FIG. 3 is a perspective view of another embodiment of a strain transducer made in accordance with the principles of the present invention;

FIG. 4 is a perspective view of an embodiment of a strain transducer which might also be used as an accelerometer; and FIG. 5 is a schematic of an exemplary circuit which may be utilized for producing a signal indicative of the

DETAILED DESCRIPTION

Figure 1:
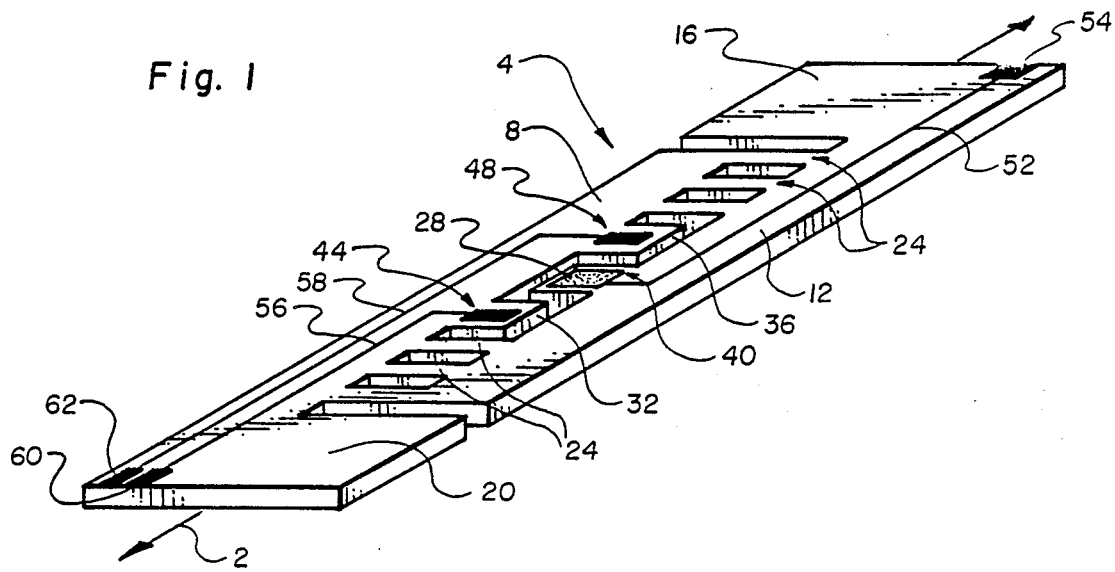
FIG. 1 is a perspective view of a flexible uniaxial strain transducer made in accordance with the principles of the present invention.

Referring to FIG. 1 there is shown one illustrative embodiment of a flexible uniaxial strain transducer for measuring the strain in an object to which or on which the transducer is attached. The transducer includes a generally planar, low-profile silicon substrate frame member 4 having a top working surface on which working parts of the transducer are disposed, and a bottom surface. The frame member 4 includes a pair of generally parallel load-bearing beams or side rails 8 and 12 which are movable longitudinally with respect to one another when the object on which the transducer is attached is subject to strain. Formed on respective ends of the beams 8 and 12, at opposite ends, are bonding pads 16 and 20. The bonding pads are generally co-planar with the beams 8 and 12 and extend from the respective beam on which they are forced to a location adjacent to and spaced from the end of the other beam. The bonding pads 16 and 20 allow for attaching the transducer by a suitable adhesive to the object in which the strain is to be measured. A plurality of laterally flexible connecting beams or struts 24 extend between and connect the beams 8 and 12. The struts 24 are generally perpendicular to the beams 8 and 12, as shown in FIG. 1. A first projection 28 extends from beam 12 toward beam 8 to a location between a second projection 32 and a third projection 36, both of which extend from beam 8 toward beam 12.

Disposed on and formed, for example, by conventional microfabrication techniques on the working surface of projection 28 is an emitter 40 for developing an electric field. The emitter, for example, might illustratively be a charged electric conductor. Disposed on and formed, for example, also by conventional microfabrication techniques such as vacuum deposition on the working surfaces of projections 32 and 36 are two detectors which, in this embodiment, are field-effect transistors (FETS) 44 and 48 respectively. A conductor 52 connects the conductive emitter 40 to an edge electrical contact pad 54 for connecting to an electrical charge source and conductors 56 and 58 connect respectively FET 44 and FET 48 to edge electrical contact pads 60 and 62 for connecting to sensor circuitry such as that shown in FIG. 3.

The emitter 40 might alternatively be a layer of material containing positive or negative charges. For example, the emitter could illustratively be a layer of polytetrafluoroethylene with electrons implanted therein.

The FETS 44 and 48 include conductive gates which are influenced by the electric field produced by the conductive emitter 40, with the degree of influence being determined by the spacing between the projection 28 and respective projections 32 and 36, i.e., the separation between the source of the electric field and the conductive gates of the FETS. The operation of FETS is well-known as is the effect of an electric field on the conductive gate of an FET. The FET includes two conductive regions, known as the drain and source regions, separated by a channel region which is conductive. The drain region and source region are maintained at different electrical potentials so that electric current is caused to flow between the regions through the channel. The gate of an FET is positioned adjacent the channel region and when the FET is exposed to an electric field, an electrical charge is induced on the surface of the gate to affect the conductivity of the channel region. This in turn determines the magnitude of the electrical current which flows between the drain region and the source region. While measuring this electrical current flow, a determination can be made as to the proximity of the source of an electric field positioned near the FETS. A further discussion of this phenomenon is found in U.S. Pat. No. 4,767,973, issued Aug. 30, 1988, which is incorporated herein by reference.

Although the FIG. 1 embodiment is shown using a conductive emitter 40 and FETS 44 and 48, it should be understood that alternatively, the conductive emitter 40 could be replaced with a magnetic field emitter such as a permanent magnet or an electromagnet and the FETS could be replaced with split drain magnetic FETS (MAGFETS) capable of detecting magnetic fields. Then, the MAGFETS would detect the spacing between each of the MAGFETS and the permanent magnet located on projection 28.

Briefly, a MAGFET is a metal-oxide semiconductor field-effect transistor (MOSFET) with two drains, i.e., the MAGFET has a source region, two drain regions, a conductive channel region between the source region and two drain regions, and a gate located adjacent to the channel region. In the absence of a magnetic field, current flows from the source region through the channel region equally to the two drain regions. When a magnetic field is present, the current through the channel region is deflected to flow more to one drain region than the other, with the magnitude of the deflection and thus imbalance of current flowing to the two drain regions being dependent upon the intensity of the magnetic field. Measuring the current imbalance in the two drain regions thus provides a measure of the proximity of a magnetic field source to the MAGFET.

The FIG. 1 embodiment shows the use of two detectors (FETS 44 and 48) positioned on either side of one emitter 40 and the advantage of this two-detector arrangement will be made clear momentarily. However, it should be recognized that use of a single detector disposed on one projection, positioned on one side of the emitter 40, could also serve to detect strain, i.e., movement of bonding pad 16 relative to bonding pad 20, as will be discussed in connection with FIGS. 2A and 2B.

The effect of a stress (pulling apart) on the object on which the transducer 4 is disposed is that bonding pads 16 and 20 are pulled apart and projection 28 moves away from projection 32 and toward projection 36. The FET deposited on projection 36 thus detects the increase in strength of the electric field being produced by the conductive emitter on projection 28 and thus the magnitude of movement of the projection 28 toward the projection 36, whereas the FET on projection 32 detects the decrease in the strength of the electric field and thus the magnitude of the movement of the projection 28 away from the projection 32. The difference between the increase in the strength of the electric field and the decrease in the strength of the electric field may be determined by a differential circuit shown in FIG. 5 to produce a resultant signal which more accurately indicates the magnitude of movement of the beams 8 and 12 relative to one another to thereby accurately measure the strain developed in the object on which the transducer 4 is mounted.

The effect of a compressive force (squeezing together) applied to the transducer 4 is that projection 28 is moved closer to projection 32 and farther away from projection 36. Again, the distance of this movement can be measured by the FETS located on projections 32 and 36 as earlier described.

Although the substrate frame 4 was described as being made of silicon, it could also be made of other materials such as polysilicon, sapphire, amorphous silicon, germanium, gallium arsenide and ceramic such as alumina, various titanates, titanium oxide and zercon. Thin film FETS could be deposited on ceramic for the detector elements. Also, although the entire FETS were described as being deposited on projections 32 and 36, it may be desirable to simply deposit the gates of the FETS on those projections and deposit the remaining parts of the FETS remotely from the gates either on the frame 4 or at some other location. In such case, the gates on the projections 32 and 36 would be coupled by appropriate conductors to the respective FETS of which they would be a part.

Figure 2:
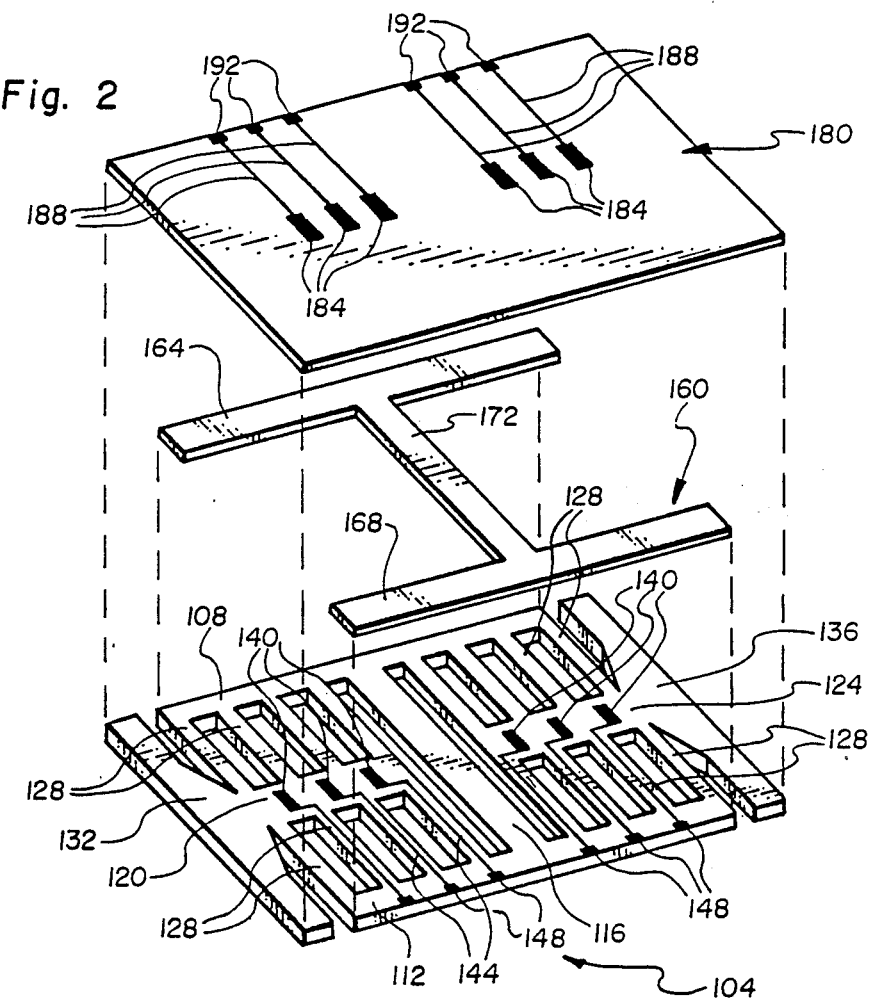
FIG. 2 is a perspective, exploded view of an alternative embodiment of a flexible uniaxial strain transducer.

FIG. 2 is a perspective, exploded view of another embodiment of a strain transducer made in accordance with the present invention. This embodiment includes a flexible, generally planar frame 104 for attachment to the object in which strain is to be measured. The frame includes a pair of parallel side beams 108 and 112 interconnected by a primary connecting beam 116 which is joined to the side beams generally at their mid points. A pair of central beams 120 and 124 are positioned in a collinear relationship to one another between the side beams 108 and 112 on each side of the primary connecting beam 116 as shown. A plurality of laterally flexible connecting beams 128 join the central beams 120 and 124 to the side beams 108 and 112 to hold the central beams in place. A pair of bonding or mounting pads 132 and 136 are joined to opposite ends of central beams 120 and 124 respectively to allow for mounting the frame 104 to the object in which strain is to be measured.

The frame 104 might illustratively be made of polyimide or other suitable flexible material.

A plurality of force field emitters 140, such as described for the FIG. 1 embodiment, are positioned in a spaced-apart relationship along the length of central beams 120 and 124 as shown. Conductors 144 connect the emitters 140 to edge electrical contact pads 148.

Positioned on top of the frame 104 is a spacer element 160 formed generally with a planar profile and in the shape of an "H". Two long, parallel legs 164 and 168 of the spacer element 160 are attached respectively to side beams 108 and 112 of the frame 104. A crosspiece 172 which joins the two legs 164 and 168 at their midpoints is attached to the primary connecting beam 116 of the frame 104. The spacer element 160 might illustratively be made of polyamide or other suitably inert material.

A substrate 180, made for example of silicon, polysilicon, sapphire, amorphous silicon, germanium, gallium arsenide or ceramic, is disposed on top of the spacer element 160 and attached at its side edges to the legs 164 and 168 of the spacer element 160. Disposed on the underneath side (although shown as being on the top side in the figure) are a plurality of detector elements 184 connected by conductors 188 to edge electrical contact pads 192. The detector elements 184, which might illustratively be FETS or MAGFETS, are positioned on the substrate 180 so as to be generally above a corresponding one of the force field emitters 140.

In operation, the frame 104 is mounted on an object in which strain is to be measured by attaching bonding pads 132 and 136 to the object. As strain occurs in the object, for example a stress or pulling apart, the bonding pads 132 and 136 are moved apart from one another pulling with them central beams 120 and 124 respectively and thereby causing the force field emitters 140 to move relative to the detector elements 184. The strain in the object does not cause the side beams 108 and 112 to move nor the spacer element 160 and substrate 180 so that the detector elements 184 remain stationary even though the force field emitters 140 are caused to move. This movement of the force field emitters may thus be detected by the detector elements and, for example, the output currents of the detector elements could be added together to provide a measure of the extent of movement and thus the strain in the object.

FIG. 3 shows a perspective, partially cutaway view of another embodiment of a strain measuring transducer. This embodiment does not have the low profile of the embodiments of FIGS. 1 and 2 but does provide a simple structure for measuring strain. The structure includes a housing 204 in the form of a box whose inside is hermetically sealed from the outside. Disposed in the housing 204 are the components which enable measurement of the strain of an object 208 on which the housing is attached.

Disposed in the housing 204 is a pivot arm 212 attached by a flexible ceiling support 216 to the top wall of the housing. Joined to the pivot arm 212 to extend downwardly from one end of the pivot arm is a leg 220. The leg extends through an opening 224 in the bottom wall of the housing 204, with the edge of the opening joined by a flexible membrane 228 to the leg 220 to maintain the hermetic seal between the inside of a housing 204 and the outside. The flexible membrane 228 is sealingly attached to the leg 220 about its exterior and to the edge of the opening 224. The membrane 228 might illustratively be made integral with the housing 204 and of beryllium copper, titanium, or like resilient materials.

The other end of the pivot arm 212 includes an array of force field emitters 232 of the type described earlier. These emitters are disposed on the end face of the arm 212 generally in a plane. Mounted on a side wall of the housing 204 is a substrate 236 which carries a plurality of force field detecting elements, again as described earlier. The array of force field emitters 232 could be disposed opposite corresponding force field detectors as described for the FIG. 2 arrangement or the force field emitters could be arrayed in a type of vernier arrangement with the force field detectors as described in the aforecited parent application. In any case, the force field detectors on substrate 236 detect movement of the force field emitters 232 and thus movement of the pivot arm 212.

The housing 204 is attached to the object 208 by attaching a foot 240 located underneath the housing on one side thereof and the leg 220 directly to the object. Then, when a strain occurs in the object along the axis defined by the foot 240 and leg 220 the leg is caused to move relative to the foot and this movement causes the pivot arm 212 to pivot upwardly or downwardly so that the force field emitters 232 are caused to move relative to the force field detectors on the substrate 236. As can be seen from FIG. 3, the length of the pivot arm 212 is greater than the length of the leg 220 so that any movement of the leg is magnified into a greater movement of the end of the pivot are thus providing increased sensitivity to determination of strain.

The housing 204, as earlier mentioned, is hermetically sealed so that the inside structure is isolated from the outside and therefore the inside structure is protected from humidity, dust, and environmental contaminants.

FIG. 4 is a perspective view of still another embodiment of a strain transducer but which may alternatively be utilized as an accelerometer. The FIG. 4 structure includes a pair of mirror image frames 304 and 308 having legs 312 and 316 respectively which contact and are attached to an object 320 in which the strain is to be measured. Support beams 324 and 328 extend laterally from legs 312 and 316 respectively towards one another, and terminate leaving a gap 332 between the ends of the beams. Depending downwardly from the beams 324 and 328 are a plurality of fingers 336 and 340 respectively. Also extending downwardly from the beams 324 and 328, and between the sets of laterally flexible fingers 336 and 340 are mounting pads 344 and 348. The mounting pads 344 and 348 extend downwardly a shorter distance than do the fingers 336 and 340 and include on the underneath surfaces thereof pairs of force field detectors 344a and 344b, and 348a and 348b. The pairs of detection elements, which could be of the type described earlier, are spaced apart from one another in the direction in which strain is to be measured.

Attached to the lower ends of the fingers 336 and 340 is a substrate 352, and disposed on the upper surface of the substrate below mounting pads 344 and 348 are force field emitters 356 and 360 respectively. Each force field emitter 356 and 360 is disposed below and about midway between respective force field detectors 344a and 344b, and 348a and 348b, as shown in FIG. 4.

In operation, when a strain occurs in object 320 of FIG. 4, the legs 312 and 316 are caused to either move closer together or farther apart which, in either case, will cause a lateral deflection of the fingers 336 and 340 and thus a movement of the emitters 356 and 360 relative to corresponding detecting elements 344a and 344b, and 348a and 348b. Such movement is detected in the manner described above to provide a measure of strain in the object 320.

The transducer of FIG. 4 could also be utilized as an accelerometer by simply including a mass of material with the substrate 352 and mounting the transducer (frames 304 and 308) on the object whose acceleration was to be measured. Then, when the object was accelerated, the mass of the substrate 352 would cause deflection of the fingers 336 and 340 (all in the same direction) to cause movement of the emitters 356 and 360 relative to respective pairs of detecting elements. Again, this movement could be measured to provide a measure of the acceleration.

The FIG. 4 structure is simple to construct in that the frames 304 and 308 could be constructed by simply cutting blocks of a material, such as silicon crystal or ceramic, using wire electro-discharge machining or similar cutting implements to form the legs 312 and 316 and fingers 336 and 340. Formation of the legs, fingers and mounting pads could also be done by chemical etching.

The transducer of FIG. 4 could be utilized for both acceleration detection and strain detection as follows. For acceleration detection, the current outputs of detecting elements 344a and 348a would be added, the current outputs of 344b and 348b would be added, and then the difference between the two sums would provide a measure of acceleration. For strain detection, the current outputs of detection elements 344a and 348b would be added as would the outputs of 344b and 348a, and then the difference between the sums would be taken to provide a measure of the strain.

FIG. 5 is a schematic of one illustrative differential circuit which could be utilized with the transducers of FIGS. 1 and 4 to measure movement of a force field emitter relative to two force field detectors (or vice versa) and thus strain in an object on which the transducers are mounted. The circuit includes a charge source or voltage source 404 coupled to an emitter 408, a voltage source 412 coupled to the drain regions of the FETS 416 and 420, two current-to-voltage converters 424 and 428, each coupled to a respective source region of the FETS 416 and 420, and two voltage amplifiers 432 and 436. The polarities of the voltage signals produced by the amplifiers 432 and 436 are opposite, and these signals are supplied to a comparator 440 which produces an output signal whose amplitude is proportional to the difference in magnitude of the input signals (indicating the magnitude of movement of FETS 416 and 428 relative to emitter 408), and whose polarity is determined by the direction of movement of the FETS. In this manner, both the magnitude of the strain in the object being measured and whether the strain is tensile or compressive can be determined.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A transducer for measuring strain in an object on which the transducer is disposed comprising
    a flexible generally planar frame member for disposition on the object and including a pair of generally parallel beams one of which is moveable with respect to the other when the object is subject to strain, and a plurality of spaced-apart laterally flexible connecting beams extending between the pair of beams,
    means disposed on said one moveable beam for producing a force field which emanates therefrom and which diminishes in strength with distance from the force field producing means,
    spacer means disposed on the other of said beams,
    substrate means disposed on said spacer means above and spaced from said frame member, and
    detection means disposed on the substrate means at a location generally above the force field producing means for detecting the presence of the force field and for producing signals representing force field strength and thus the distance of the detection means from the force field producing means.

2. A transducer as in claim 1 further including additional force field producing means disposed along said one moveable beam and spaced apart from one another, and additional detection means disposed on the substrate means, each at a location generally above a corresponding force field producing means, and each for detecting the presence of a force field and for producing signals representing force field strength of a corresponding force field producing means.

3. A transducer as in claim 2 wherein said detection means are located on the underside of the substrate means facing the frame member.

4. A transducer as in claim 1
    wherein said frame member comprises first and second spaced apart generally parallel side beams, a laterally flexible primary connecting beam extending between and joined to the first and second beams near their midpoints, third and fourth central beams disposed in a generally collinear relationship between the first and second beams and generally in parallel therewith on opposite sides of the primary connecting beam, a plurality of laterally flexible connecting beams some of which connect the third central beam to the first and second beams and others of which connect the fourth central beam to the first and second beams, and first and second bonding pads joined to the third and fourth central beams respectively at opposite ends thereof for mounting the frame on the object, wherein said force field producing means comprises at least first and second means for producing force fields and disposed on the third and fourth central beams respectively, wherein said spacer means comprises first and second elongate spacer elements disposed on the first and second side beams respectively, and a cross spacer element extending between the first and second spacer elements to generally overlie the primary connecting beam, wherein said substrate means comprises a generally planar plate disposed on the spacer means above the frame member, and wherein said detection means comprises at least first and second detecting means disposed on the underneath side of said plate generally above said first and second force field producing means respectively for producing signals representing the strengths of the force fields of the first and second force field producing means.

5. A transducer as in claim 4 wherein said frame member is comprised of polyimide.

6. A transducer as in claim 5 wherein said spacer means is comprised of polyimide.

7. A transducer as in claim 1 wherein said force field producing means comprises means for producing an electric field, and wherein said detection means comprises a field-effect transistor for producing an output which is proportional to the distance of the field-effect transistor from the electric field producing means.

8. A transducer as in claim 1 wherein said force field producing means comprises means for producing a magnetic field, and wherein said detection means comprises a split-drain magnetic field-effect transistor for producing an output which is proportional to the distance of the field-effect transistor from the magnetic field producing means.

* * * * *